Figure 1:
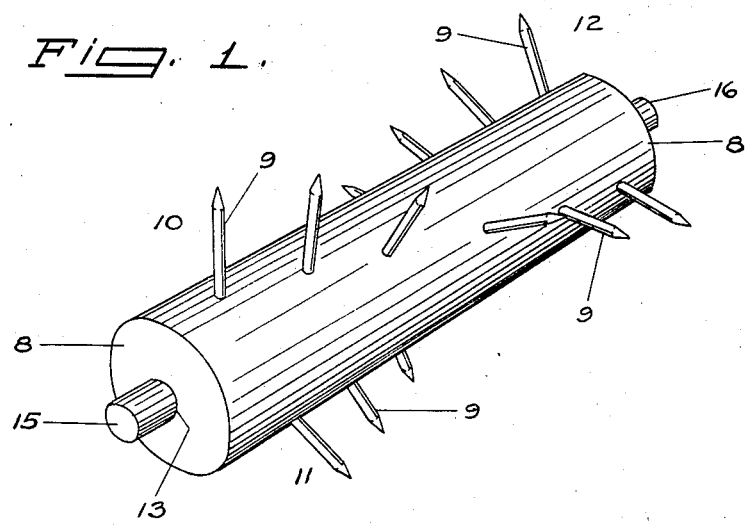

Oct. 4, 1949.　　　T. J. ROCHE ET AL　　　2,483,846
LAWN PERFORATOR

Filed April 2, 1947　　　　　　　　　　　　2 Sheets-Sheet 1

INVENTORS
THOMAS J. ROCHE
JOHN A. ROCHE
BY Edward C. Healy
ATTORNEY

Oct. 4, 1949.    T. J. ROCHE ET AL    2,483,846
LAWN PERFORATOR
Filed April 2, 1947    2 Sheets-Sheet 2
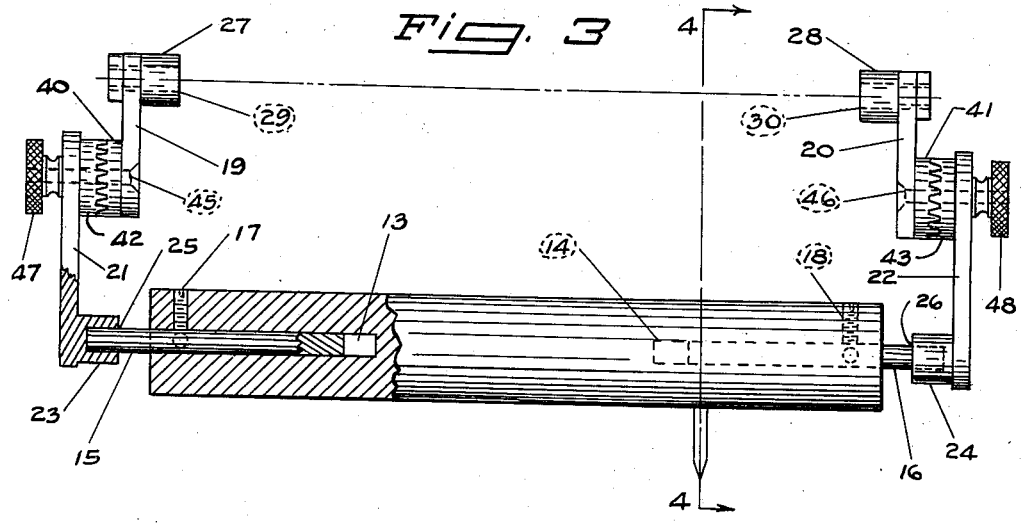
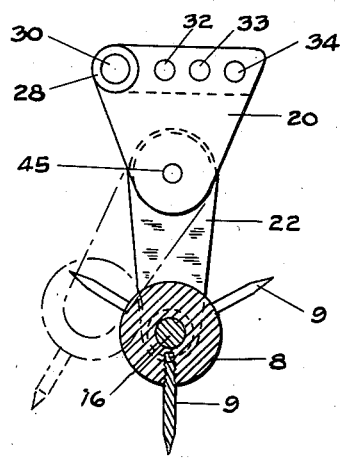
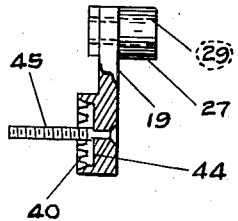
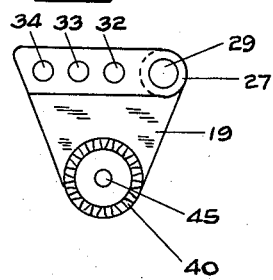
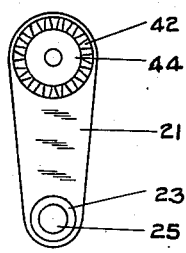
INVENTORS
THOMAS J. ROCHE
JOHN A. ROCHE
BY Edward C. Healy
ATTORNEY Patented Oct. 4, 1949

2,483,846

UNITED STATES PATENT OFFICE 2,483,846

LAWN PERFORATOR

Thomas J. Roche and John A. Roche,
San Francisco, Calif.

Application April 2, 1947, Serial No. 738,814

1 Claim. (Cl. 56—249)

This invention relates to an improvement in lawn perforators and has particular reference to a device in the form of an elongated roller having a plurality of spaced prongs spirally arranged on and around the periphery thereof, which roller is capable of being attached to a conventional lawn mower, whereby the ground surface of the lawn is automatically perforated during the cutting of the lawn.

The primary object of the present invention is the provision of an improved means for adjusting the device, whereby the penetrating distance of the prongs, relative to the soil can be varied.

Another object of the present invention is to construct the said adjustment means in a manner for enabling the perforating prongs to be adjusted entirely away from the ground surface whereby the lawn mower can be operated, when desired, without perforating the soil.

A further object of the present invention is to preferably construct the said adjustment means of a pair of oppositely disposed adjustable arms, each of the said arms being composed of two sections adjustably secured one to the other through the medium of an especially constructed claw clutch, whereby the angular positions of the said sections forming the arms can be adjusted to vary the distance of the perforating points of the prongs from the surface of the ground.

A still further object of the present invention is to revolvably support the roller of the lawn mower in the inner sections forming the said arms and to revolvably support the roller carrying the prongs in outer adjustable sections forming the arms, whereby the perforating points of the prongs can be varied relative to the periphery of the lawn roller.

A still further object of the present invention is the improved means provided for revolvably supporting the said roller carrying the prongs, whereby the device is adjustably carried on lawn mowers of different widths in a new and improved manner.

A still further object of the present invention is the improved means provided for revolvably supporting the said roller carrying the prongs, whereby the device is adjustably carried on lawn mowers of different widths in a new and improved manner.

A still further object of the present invention is the provision of an improved lawn perforator that is durable, simple in construction, economical to manufacture, adjustable to accommodate a wide range of needs and highly efficient and serviceable in use.

Other objects and advantages will be apparent during the course of the following description.

Figure 2:
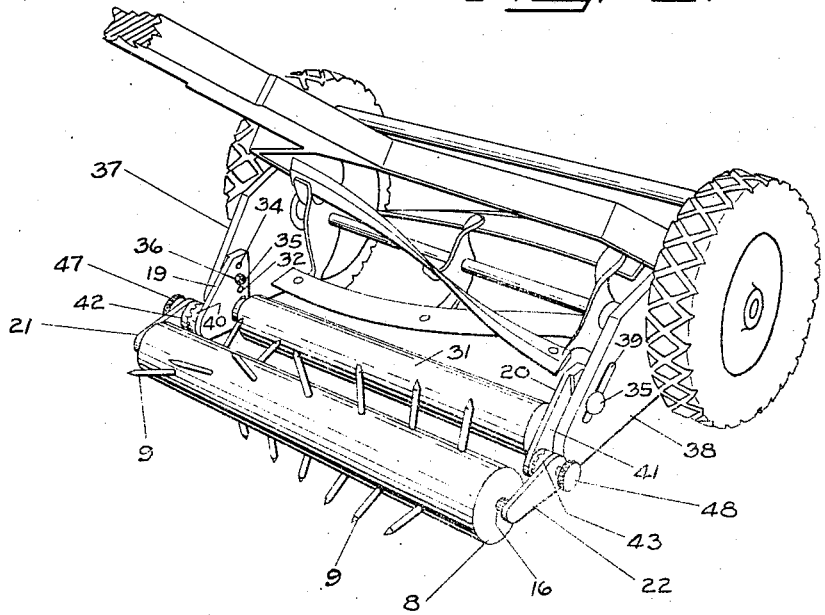

In the accompanying drawings forming a part of the specification, wherein for the purpose of illustration like numerals designate like parts throughout the same, Fig. 1 is a perspective view of the perforator roller showing a series of prongs arranged in a plurality of spirally formed rows thereon, Fig. 2 is a perspective view of a conventional lawn mower with the perforator secured thereon in one of its adjusted operative positions, Fig. 3 is a plan view of the device shown partly in elevation and partly in section, Fig. 4 is an end sectional view taken on line 4—4 of Fig. 1, looking in direction of the arrows.

Fig. 5 is a side view of one of the inner members forming the adjustable arms, shown partly in elevation and partly in section, Fig. 6 is a plan view of the same, and Fig. 7 is a plan view of one of the outer members forming the adjustable arms.

Referring in detail to the drawings and to the numerals thereof, the numeral 8 designates the perforator roller, which roller is preferably an elongated round metal bar and is provided with a plurality of sharp prongs 9 that are arranged in a series of spirally extending rows 10, 11 and 12 as shown to advantage in Fig. 1 and 2. The perforator roller 8 is concentrically apertured in each outer end thereof as at 13 and 14, for accommodating a pair of oppositely disposed shafts 15 and 16, respectively, which shafts are rigidly secured to the roller by suitable set screws 17 and 18. The said shafts are thus adjustably secured to the roller and are extensible or retractable for accommodating different widths of lawn mowers.

The means provided for connecting the perforator roller to the lawn mower comprises a pair of inner oppositely disposed arm sections 19 and 20 and a pair of outer oppositely disposed arm sections 21 and 22, the said arm sections being formed right and left hand and positioned as shown to advantage in Figs. 2 and 3. The outer lower arm sections 21 and 22 are constructed with bosses 23 and 24 respectively, recessed as at 25 and 26 for revolvably supporting the perforator roller shafts 15 and 16. Likewise the inner arm sections 19 and 20 are formed with bosses 27 and 28, respectively, which bosses 27 and 28 are apertured as at 29 and 30, for revolvably supporting the shaft of the lawn mower roller 31. The said inner arm sections 19 and 20 are preferably triangular in shape as illustrated in Figs. 4 and 6 and are provided with a plurality of holes 32, 33 and 34 for accommodating suitable bolts and nuts 35 and 36, respectively, whereby the device is secured to the roller retaining sides 37 and 38 of the lawn mower, the said sides of the lawn mower being slotted as shown at 39 in Fig. 2. It will be obvious that when the inner arm sections 19 and 20 are connected to the outer arm sections 21 and 22, respectively, a pair of complete adjustable arms are provided.

The means provided for connecting the said inner and outer arm sections together consists in forming a pair of radially notched coupling members 40 and 41 on the inner arm sections 19 and 20 and a similar pair of radially notched coupling members 42 and 43 on the outer arm sections 21 and 22 forming a claw clutch for connecting the arm sections as illustrated to advantage in Fig. 3. It will be noted that the notched or toothed portions of the coupling members are on the joining faces thereof as shown in Fig. 3, whereby the arm sections are circumferentially adjustable with respect to each other. The notched faces of the coupling members are preferably recessed as at 44 in Fig. 5 to facilitate the forming of the same. Suitable bolts 45 and 46 equipped with thumb nuts 47 and 48, respectively, as shown in Figs. 3 and 5 are provided for rigidly tightening the respective sections one to the other.

From the foregoing description taken in conjunction with the accompanying drawings it is obvious that the arm sections are rigidly locked together in a positive manner capable of withstanding terrific strain and hard usage, whereby the perforator roller shafts are retained in alignment and the said roller can be adjusted upwardly or downwardly in a positive manner independent of the lawn mower roller to vary the penetrating distance of the prongs and thereby obtain the exact depth of perforations desired.

It is to be understood that the form of our invention herewith shown and described is to be taken as a preferred embodiment of our invention and that changes relative to the size, shape and arrangement of parts may be resorted to without departing from the spirit of the invention or the scope of the subjoined claim.

Having thus described our invention, we claim:

In combination with a lawn mower, a device of the character described comprising a perforator roller, a plurality of prongs arranged in spirally extending rows provided thereon, an elongated aperture concentrically formed in each end of the roller, a shaft slidably mounted in each aperture and adjustably secured longitudinally to the roller, a pair of oppositely disposed arms removably secured to the side portions of the lawn mower, means for revolvably supporting the said shafts in the said arms, whereby the perforator roller is revolvably carried, the inner end portions of the said arms being supported in notched couplings to the side portions of the lawn mower, whereby the said arms are adjustable at different angles relative to the lawn mower.

THOMAS J. ROCHE.
JOHN A. ROCHE.

REFERENCES CITED

The following references are of record in the file of this patent:

UNITED STATES PATENTS

| Number | Name | Date |
|---|---|---|
| 1,600,663 | Barrowman | Sept. 21, 1926 |
| 2,085,113 | Miller | June 29, 1937 |
| 2,231,821 | Sprouse | Feb. 11, 1941 |